(12) United States Patent
Bowes et al.

(10) Patent No.: US 11,860,863 B1
(45) Date of Patent: Jan. 2, 2024

(54) DATA REDACTION IN A JOURNAL-BASED DATABASE

(71) Applicant: Amazon Technologies, Inc., Seattle, WA (US)

(72) Inventors: Marc Bowes, Seattle, WA (US); Victoria Elizabeth Scearcy, Seattle, WA (US); Kritin Gokharu, Bellevue, WA (US); Eric Justin Kraemer, Bellevue, WA (US); Junaid Azad Mohammed, Redmond, WA (US); Abigail Marie Kuic, Seattle, WA (US); Robert McGregor Marrowstone, Greenbank, WA (US); Steven Michael Hershey, Seattle, WA (US); Yosseff Levanoni, Redmond, WA (US); Omer Ronen, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,331

(22) Filed: Jun. 30, 2022

(51) Int. Cl.
*G06F 16/23* (2019.01)
*H04L 9/00* (2022.01)

(52) U.S. Cl.
CPC ............ *G06F 16/2379* (2019.01); *H04L 9/50* (2022.05)

(58) Field of Classification Search
CPC ... H04L 9/50; H04L 63/0428; G06F 16/2365; G06F 16/21
See application file for complete search history.

(56) References Cited

U.S. PATENT DOCUMENTS

| | | | |
|---|---|---|---|
| 2022/0069977 A1* | 3/2022 | Manevich | H04L 9/32 |
| 2022/0123945 A1* | 4/2022 | Yang | H04L 9/3247 |

OTHER PUBLICATIONS

AWS, Amazon Quantum Ledger Database (Amazon QLDB), https://docs.aws.amazon.com/qldb/latest/developerguide/qldb-dg.pdf#ql-reference.docs, Jan. 2022, pp. 1-822.

* cited by examiner

*Primary Examiner* — Hau H Hoang
(74) *Attorney, Agent, or Firm* — S. Scott Foster; Kowert, Hood, Munyon, Rankin & Goetzel, P.C.

(57) ABSTRACT

A journal-based database may include items, e.g., organized in a table, associated with a journal. The journal may include a hash-chained set of blocks individually including data representing previous and/or current versions of the individual items. The database may receive a request to redact specific data from the database. The database may search the blocks to determine whether the specific data exists. When the specific data exists in a block of the journal, the database may redate the specific data in the identified block. The database may retain existing metadata of the block such that cryptographic verifiability of the hash-chained blocks may be preserved.

20 Claims, 15 Drawing Sheets

```
CREATE TABEL VehicleRegistration
CREATE INDEX ON VehicleRegistration (ID)
CREATE INDEX ON VehicleRegistration (Manufacturer)
CREATE INDEX ON VehicleRegistration (Model)
CREATE INDEX ON VehicleRegistration (Year)
CREATE INDEX ON VehicleRegistration (VIN)
CREATE INDEX ON VehicleRegistration (Owner)
INSERT INTO VehicleRegistration
{
    'ID' : '1',
    'Manufacturer' : 'Carmaker',
    'Model' : 'Model S',
    'Year' : '2012',
    'VIN' : '1234567890',
    'Owner' : 'John Doe'
}
```
240

| ID | Manufacturer | Model | Year | VIN | Owner |
|----|--------------|---------|------|-----------|----------|
| 1  | Carmaker     | Model S | 2012 | 123456789 | John Doe |

```
UPDATE VehicleRegistration
SET Owner = 'Jane Doe'
WHERE ID = '1'
```

206

| ID | Manufacturer | Model | Year | VIN | Owner |
|---|---|---|---|---|---|
| 1 | Carmaker | Model S | 2012 | 123456789 | Jane Doe |

*FIG. 2B*

DELETE FROM VehicleRegistration
WHERE ID = '1'

_244_

| ID | Manufacturer | Model | Year | VIN | Owner |
|---|---|---|---|---|---|
| | | | | | |
| | | | | | |

_202_

| Version | Date | ID | Manufacturer | Model | Year | VIN | Owner |
|---|---|---|---|---|---|---|---|
| 1 | 07/16/2012 | 1 | Carmaker | Model S | 2012 | 123456789 | John Doe |
| 2 | 08/03/2013 | 1 | Carmaker | Model S | 2012 | 123456789 | Jane Doe |
| 3 | 09/02/2016 | 1 | | | Deleted | | |

```
transactionInfo : {
        CREATE TABEL VehicleRegistration
        CREATE INDEX ON VehicleRegistration (ID)
        CREATE INDEX ON VehicleRegistration (Manufacturer)
        CREATE INDEX ON VehicleRegistration (Model)
        CREATE INDEX ON VehicleRegistration (Year)
        CREATE INDEX ON VehicleRegistration (VIN)
        CREATE INDEX ON VehicleRegistration (Owner)
        INSERT INTO VehicleRegistration
        }
revisions : {
        'ID' : '1',
        'Manufacturer' : 'Carmaker',
        'Model' : 'Model S',
        'Year' : '2012',
        'VIN' : '1234567890',
        'Owner' : 'John Doe'
}
```
324

```
blockHash : {{blockHash#1}}
entriesHash : {{entriesHash#1}}
previousBlockHash
Date : 07/16/2012
```
326

```
transactionInfo : {
        UPDATE VehicleRegistration
        }
revisions : {
        'ID' : '1',
        'Manufacturer' : 'Carmaker',
        'Model' : 'Model S',
        'Year' : '2012',
        'VIN' : '1234567890',
        'Owner' : 'Jane Doe'
}
```

328 blockHash : {{blockHash#2}}
entriesHash : {{entriesHash2}}
previousBlockHash : {{blockHash#1}}
Date : 08/03/2013

```
transactionInfo : {
        DELETE FROM VehicleRegistration
        }
revisions : {
}
```

320

```
blockHash : {{blockHash#3}}
entriesHash : {{entriesHash3}}
previousBlockHash : {{blockHash#2}
Date : 09/02/2016
```

```
transactionInfo : {
        CREATE TABEL VehicleRegistration
        CREATE INDEX ON VehicleRegistration (ID)
        CREATE INDEX ON VehicleRegistration (Manufacturer)
        CREATE INDEX ON VehicleRegistration (Model)
        CREATE INDEX ON VehicleRegistration (Year)
        CREATE INDEX ON VehicleRegistration (VIN)
        CREATE INDEX ON VehicleRegistration (Owner)
        INSERT INTO VehicleRegistration
        }
revisions : {
        dataHash : {{xxxxxx}}
        Date : 10/23/2021
}
```

332

```
blockHash : {{blockHash#1}}
entriesHash : {{entriesHash#1}}
previousBlockHash
Date : 07/16/2012
```

318 transactionInfo : {
    REDACT block_xxx, item_yyy, version_zzz
}
redactionInfo : {
    block_xxx, item_yyy, version_zzz
}

334 blockHash : {{blockHash#4}}
entriesHash : {{entriesHash4}}
previousBlockHash : {{blockHash#3}}
Date : 10/23/2021

DATA REDACTION IN A JOURNAL-BASED DATABASE

BACKGROUND

Cloud storage gives users the ability to store and maintain files on remote computing systems which are generally referred to as the "cloud" or provider network. Generally, a cloud or provider network is offered and operated by a third party, and does not reside on the premise of the users. The users may access the storage service of the remote cloud or provider network via network connections. The users may pay for the storage service on an as-needed basis, e.g., based on a size of the required storage, a number of access requests to the stored files, a size of the files being accessed, and so on.

Traditional data storage systems may allow users to create databases for storing records. The traditional databases may provide users the flexibility to update records, e.g., redact data, in the databases. However, they may not track the complete change history to the records of the database. To improve integrity, cryptography-based technologies, e.g., blockchains, may be applied to the traditional databases to create blockchain-based database. In a blockchain-based database, changes to records of the database may be captured in a blockchain-based ledger. Generally, the ledger is immutable, and data in the ledger cannot be changed, in order to provide cryptographic verifiability. However, sometimes there may be a need, e.g., to meet regulatory requirements or for other security reasons, to redact data of the database, including data in the ledger. Therefore, it is desirable for databases that are able to provide benefits of blockchain-based cryptographic verifiability but also flexibility for data redaction.

BRIEF DESCRIPTION OF THE DRAWINGS

FIGS. 2A-2C show example pseudo-statements in query languages to commit a series of updates to records and resultant versions of the records, associated to some embodiments.

FIGS. 3A-3E show example blocks in a journal corresponding to a series of record updates, according to some embodiments.

Figure 1:
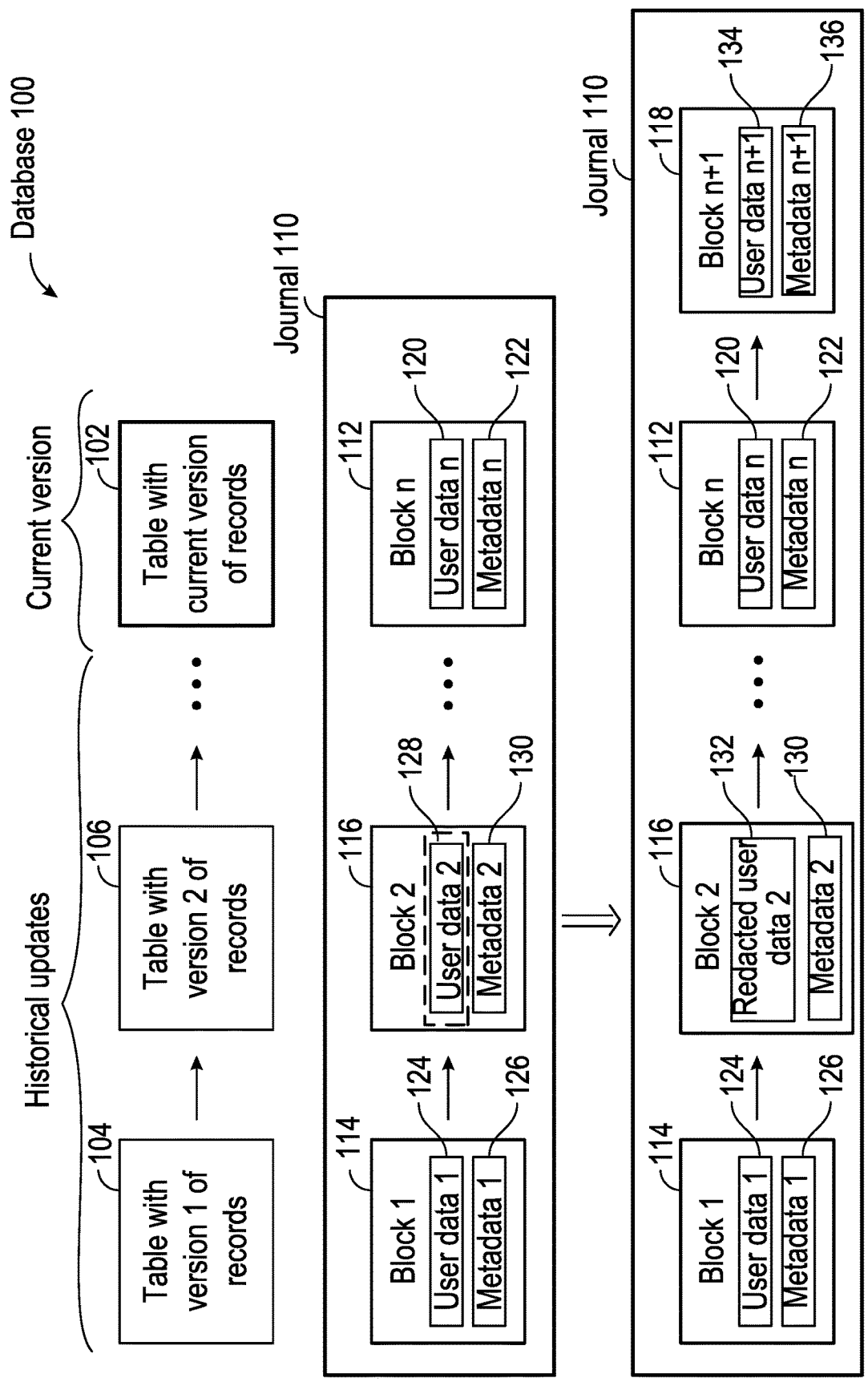
FIG. 1 is a block diagram showing data redaction in an example journal-based database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to a journal-based database that allows data redaction in records of the database as well as in blocks of blockchain-based journals of the database. In some embodiments, the database may be implemented using one or more computing devices of a network-accessible or cloud-based service provider network. For example, the database may be part of a multi-tenant data storage service offered by the service provider network. The computing devices of the service provider network may implement a database management system, accessible by multiple tenant or users via network connections, to perform various database-related functions including data redaction. In addition, the computing devices may provide memory and storage spaces for storing records and/or other data of databases. To simplify description, the terms "database" and "database management system" may be used interchangeably in the disclosure. One shall understand that a database may store records, and a database management system may perform various functions for managing a database.

In some embodiments, the database may include records, e.g., organized in one or more tables corresponding to respective indices. Each table may be also associated with a corresponding journal. For a given table, the journal for the table may include a set of blocks. Each block may include user-generated data and other system-generated data. For purposes of illustration, the user-generated data may be referred to as "user data" or "application data," whereas the system-generated data may be referred to as "metadata." One example of the user data may be individual transactions from a user committed to update records in a database and/or corresponding versions of the records produced by the individual transactions, whereas one example of the metadata may be hash values automatically generated by the database. Given that the blocks include the user data representing the transactions and associated records of the transactions, in some embodiments, the blocks in the journal may be considered a log to record the transactions committed to the database.

In some embodiments, each block of the journal may include at least one hash value, which may be generated based on the user data (e.g., corresponding version of records and/or transactions) inside this block but also the user data (e.g., previous versions of records and/or previous transactions) inside one or more previously-generated block(s), e.g., the block generated immediately before this block. The hash value may uniquely represent and serve as an "ID" identifying this block. Because the hash value of one block may be generated based at least in part on the hash value(s) of previous block(s), the hash values of the set of blocks may provide an inter-dependency. For example, the hash value of a first block depends on the hash value of a second block preceding the first block, the hash value of the second block further depends on the hash value of a third block preceding the second block, and so on, until the very first and original block. As a result, with the hash values, the blocks may be able to refer to each other and thus may be visually considered "connected" together to form a hash chain, like a blockchain. Also, with the inter-dependency between the hash values, the contents of the blocks, such as the history of the records and/or transactions, may be able to be checked and cryptographically verified.

In some embodiments, each block may also include metadata generated by users. The user-generated metadata may include data that is separate from the above-described user data. Instead, the user-generated metadata may be provided mainly as descriptive information of the user data, to facilitate the organization and management of the user data stored in the database. One example of the user-generated metadata may be tags provided by users, e.g., to indicate purposes of records, users or owners of records, etc.

In some embodiments, a user may store records in a database, e.g., in a table of the database, and the database may accordingly create a journal to track the transactions to the records of the database. The changes to the records and the recording of the changes to the records may be considered as two parallel "processes." On one hand, the user may request the database to perform the individual transactions to update one or more records in a database. For example, the user may create a table, and insert, update, and/or delete record(s) in the table. On the other hand, the transactions and changes to the records may be stored in respective blocks of the journal. As a result, using information of the blocks, the transaction history and thus integrity of the database may be able to be checked and cryptographically verified.

As described above, traditionally, the blocks of a journal are immutable, meaning that their contents are not allowed to change. However, sometimes there may be a need to change data, e.g., redact data, in one or more blocks of the journal. For example, some regulatory requirements, e.g., General Data Protection Regulation (GDPR), California Consumer Privacy Act (CCPA), etc., may require businesses to provide consumers the control over personal information that the businesses have collected. In that case, if a business uses the journal-based database to collect records of consumers, the personal information may exist not only in the records but also in blocks of the journal. Therefore, to meet the regulatory requirement, the contents of the blocks may not be strictly immutable anymore. Instead, data such as personal information in the block(s) may need to be redactable. Moreover, in addition to regulatory requirements, other types of sensitive information may also need to be redacted sometimes. For example, sometimes financial information (e.g., such as credit card information) of a person or organization, confidential and/or proprietary information of an organization, or other nonpublic information of a person or organization may also need to be redacted from a journal-based database.

Therefore, to meet the various requirements, the journal-based database described in this disclosure may provide the ability to allow a user to redact data from both records in a table and blocks in a journal, but still maintain the cryptographic verifiability of the blocks. In some embodiments, to implement the data redaction, a user may provide a request to the database, specifying the data to be redacted. In response to the request, the database may search the table and journal to determine where the data exists. If the data exists in a block of the journal, the database may redact the data in the block. If the data exists in the table, the database may also redact the data in the table. In addition, to maintain cryptographic verifiability, the data redaction may not alter existing metadata, or at least the portion of existing metadata in the block that is associated with the cryptographic verification of the hash-chained set of blocks. For example, the data redaction may retain the hash value identifying the block and leave it intact. Also, in some embodiment, the position of the block in the chain may stay the same. As a result, after the redaction, only the data requested to be redacted may get redacted in a block, whereas the remaining data of the hash-chained set of blocks and therefore the cryptographic verifiability of the chain may remain unchanged.

The journal-based, data-redactable database described in the disclosure can provide at least several benefits. One, in contrast to traditional non-blockchain based databases, the database may use a journal including a hash-chained set of blocks to provide cryptographic verifiability. Two, in contrast to traditional blockchain-based databases, the database may allow users to redact data, e.g., personal information and/or other sensitive information, thoroughly from the database to meet regulatory and/or business requirements.

FIG. 1 is a block diagram showing data redaction in an example journal-based database, according to some embodiments. For purposes of illustration, in this example, database 100 may include table 102 associated with journal 110. Table 102 may include a current version of one or more records. In addition, for purposes of illustration, it may be assumed that records of the table have gone through a series of changes, as indicated in FIG. 1. For example, at first, a user may create the table and insert one or more records into the table to generate table 104 with version 1 or original version of records. Next, the user may update the records in table 104 to generate another table 106 with version 2 of records. For example, the user may insert or add new record(s), update or change value(s) of existing record(s), and/or delete or remove existing record(s). The user may perform the updates to the records repeatedly, e.g., over a period of time, to finally result in table 102 that includes the current version of records. In some embodiments, table 102 with the current version of records may be always stored in database 100, whereas tables 104 and 106 with the previous versions of records may or may not be kept in database 100.

To track the change history to the records, database 100 may generate journal 110 to store the above-describes updates and associated versions of records of the table. For example, when the user generates table 104 and inserts version 1 of the records, database 100 may generate block 114 in journal 110. In some embodiments, block 114 may include user data 124 and metadata 126. In some embodiments, user data 124 may include entry objects that represent the record revisions that are inserted, updated, and/or deleted, along with the transactions (e.g., statements in query languages) that committed the revisions. For example, as indicated in FIG. 1, user data 124 may include the transaction of the updates (e.g., the creation of the table, and the insertion of records), as well as version 1 of the records after the updates are committed. In some embodiments, metadata 126 may include at least one hash value generated based on user data 124. Therefore, the hash value may be considered a representation of user data 124 of block 114. In addition, the hash value may serve as a unique ID identifying block 114. In some embodiments, various hash algorithms may be applied to calculate the hash value, for example, Secure Hashing Algorithm algorithms (e.g., SHA-0, SHA-1, SHA-2, SHA-256, etc.), RACE Integrity Primitives Evaluation Message Digest algorithms (e.g., RIPEMD, RIPEMD-128, RIPEMD-160, RIPEMD-256, RIPEMD-320, etc.), Message-Digest algorithms (e.g., MD2, MD4, MD5, MD6, etc.), BLAKE algorithms (e.g., BLAKE 2, BLAKE3, etc.), Whirlpool algorithm, and so on.

Similarly, when the user updates the records of table 104 to generate table 106 with version 2 of records, database 100 may accordingly generate another block 116 in journal 110. Block 116 may include user data 128 to store the transaction of the corresponding updates to the records and version 2 of the records after the committed transaction, and metadata 130. In some embodiments, metadata 130 may include at least one hash value that is generated based on user data 128 of block 116 but also user data 124 of block 114, because block 116 is the second block, unlike the first and original block 114. In some embodiments, metadata 130 may also include a copy of the hash value of metadata 126 that identifies block 114. Therefore, with the hash values, block 116 may be able to refer to block 114, and may be visually considered appended to block 114. Also, as described, the hash values of block 116 may depend on the hash value of block 114. Therefore, with the hash values, the contents of the two blocks may be checked against each other and thus cryptographically verifiable.

The above may be repeated along with the changes to records of the table, where database 100 may generate one or more corresponding blocks in journal 110 to track the corresponding transactions and versions of records, until block 112 that is generated corresponding to table 102 with the current version of records. Similarly, block 112 may include user data 120 and metadata 122. In some embodiments, user data 120 may include data representing the transaction committed to make the current version of records of table 102, and data representing the current version of the records. In some embodiments, metadata 122 may include at least a hash value representing user data 120 and uniquely identifying block 122. In some embodiments, metadata 122 may also include a copy of the hash value of the previous block immediately preceding block 112. All the blocks 114, 116, . . . , 112 may thus form a hash-chained set of blocks, with cryptographic verifiability, in journal 110.

In some embodiments, the user may need to redact data from database 100. In that case, the user may send a request to database 100, specifying the data to be redacted. According to the foregoing description, in some embodiments, the data may exist in the current version of records in table 102, the previous versions of records in tables 104 and 106, and/or one or more blocks in journal 110. In some embodiments, database 100 may search tables 102-106 and the individual blocks of journal 110 to determine whether any of them contains the specific data. For example, the data may exist in user data 128 of block 116. Accordingly, database 110 may cause the specific data in user data 128 of block 116 to be redacted. Meanwhile, database 110 may still retain metadata 130 of block 116, as indicated in FIG. 1. As a result, user data 128 of block 116 may change into "new" or updated user data 132 in which the specific data is redacted, but the remaining data of block 116, including metadata 130, may stay the same. In addition, in some embodiments, the position of block 116 in the hash-chained set of blocks may remain the same. For example, as indicated in FIG. 1, block 116 with updated user data 132 may still remain as the second block in journal 110.

In some embodiments, database 100 may further generate block 118 to track the transaction that requests the data redaction. As indicated in FIG. 1, block 118 may include user data 134 and metadata 136. In some embodiments, user data 134 may include data representing the request, but not the data that is redacted. In some embodiments, metadata 136 may include at least one hash value generated based on user data 134 and user data 120 of block 112. In some embodiments, metadata 136 may also include a copy of the hash value in metadata 122 that identifies block 112. As a result, with the hash values, block 118 may be append to block 112 in journal 110.

In some embodiments, if the data to be redacted exists in a previous version of records, e.g., in the records of table 106 corresponding to the above-described block 116, database 100 may redact the data in the records of table 106. In some embodiments, if the data to be redacted exits in the current version of records of table 102, database 100 may also cause table 102 to be updated, such that the data becomes redacted. In some embodiments, the data redaction may not necessarily be allowed to apply directly to the current version of records of table 102. In that case, database 100 may generate a "new" table in the database to include the current version of records in table 102 except that the specific data is redacted, and then delete table 102 from the database. In addition, database 100 may further redact data from user data 120 of block 112 corresponding to table 102. In some embodiments, database 100 may generate a new block corresponding to the "new" table, similar to what is described above, and append the new block to block 118.

In some embodiments, when data requested to be redacted exists in multiple blocks of journal 110, redaction of data may be allowed to be applied to the individual blocks all at once or one at a time. In the first case, database 100 may redact the specific data from all the identified blocks at or around the same time. Alternatively, in the second case, database 100 may perform the data redaction to the individual blocks that include the specific data, one after another. For example, database 100 may targets a first block that includes the specific data, and redact the data in the first block. Next, database 100 may move to a second block to redact the data in the second block, and so on, until the data in the corresponding blocks gets redacts. In some embodiments, database 100 may perform the redaction in a specific order, e.g., from the block at the front of the chain towards blocks at the end of the chain. Alternatively, in some embodiments, the order in which the blocks get redacted may not necessarily matter, and thus database 100 may not necessarily perform the redaction in a fixed order. In addition, similar to what is described above, after the data redaction is completed for all the blocks, database 100 may generate a block, similar to block 118, to capture the transaction for the redaction request.

In some embodiments, redaction of data in tables 102 and/or journal 110 may include replacing the data with a hash value, or deleting the data. Either way, after the redaction, the data may become no more accessible.

For purposes of illustration, consider an example where a user may create a table called "VehicleRegister" in a journal-based database (e.g., similar to database 100) to record vehicle registration information. The user may insert a new vehicle's registration in the table. Next, the user may update the vehicle's registration to change the owner from one person to another. Finally, the user may delete the vehicle's registration from the table. For purposes of illustration, FIGS. 2A-2C illustrate example pseudo-statements in query languages to perform these transactions to update the records of the table.

For example, as indicated in FIG. 2A, the user may use the pseudo-statements in block 240 to create the table and add registration records for a Carmaker Model S vehicle. As the result of the transaction, table 204 (e.g., similar to table 104) may be created with version 1 of records. The transaction may be committed on Jul. 16, 2012. As shown in the records, the owner of the vehicle s "John Doe" at that time.

Next, the user may perform another transaction with the pseudo-statements in block 242 to update the vehicle's registration to change the owner from "John Doe" to "Jane Doe." The transaction may be committed on Aug. 3, 2013. As the result of the transaction, table 204 may be updated into table 206 (e.g., similar to table 106) with version 2 of records, as shown in the figure.

Finally, the user may perform another transaction with the pseudo-statements in block 244, to delete the vehicle's registration from the table. The transaction may be committed on Sep. 2, 2016. As the result of the transaction, table 206 may be further updated into table 202 (e.g., similar to table 102) with the current version of records. Also, for purposes of illustration, a history of the changes to the table is also provided in table 246. As indicated in table 246, these three transactions are committed respectively on Jul. 16, 2012, Aug. 3, 2013, 2013, and Sep. 2, 2016, to result in the respective three versions of records.

As described above, along with the updates to the records, the database may generate a journal with respective blocks to track the change history. In this example, given that there are three transactions, the database may generate at least three respective blocks, e.g., blocks 314, 316, and 312 (e.g., similar to blocks 114, 116, and 112) as shown in FIGS. 3A-3B.

As shown in FIG. 3A, block 314 may include user data 324 (e.g., similar to user data 124) and metadata 326 (e.g., similar to metadata 126). As described above, user data 324 may include entry objects that represent the record revisions that are inserted, updated, and/or deleted, along with the transactions (e.g., statements in query languages) that committed the revisions. For purposes of illustration, user data 324 may include data organized in one or more fields. For example, user data 324 may include data in the "transactionInfo" field and "revisions" field. The "transactionInfo" field may include data representing the transaction (e.g., statements in query languages) committed in block 240, such as the creation of the table, the addition of the indices, and the insertion of the vehicle's registration. The "revisions" field may include data representing at least a partial version of the records of the table after the transaction committed to the database. For example, the "revisions" field may include data representing the "latest" non-deleted version of records in the table after the transaction is committed. In this example, the "revisions" field may include data representing version 1 of the vehicle's registration records in table 204 of FIG. 2A. Therefore, the data in the "revisions" field may be considered a "snapshot" of at least a partial version of the records. In addition to user data 324, metadata 326 may include one or more system-generated data descriptive of user data 324 of the block. For example, metadata 326 may include an "entriesHash" that is a hash value calculated based on user data 324. For example, the "entriesHash" may be the root hash of a Merkel tree in which the leaf nodes include user data 324. Therefore, the "entriesHash" may be considered a representation of user data 324 of block 314. In addition, metadata 326 may include a "previousBlockHash" that is the hash value of the previous block preceding block 314. In this case, because block 314 is the first and original block generated after creation of the table, there is no other blocks preceding block 314, and thus the "previousBlockHash" is empty. Moreover, metadata 216 may include a "blockHash" that is a hash value that is generated based on the "entriesHash" and "previousBlockHash." For example, the "blockHash" may be the hash of the concatenation of "entriesHash" and "previousBlockHash." As a result, the "blockHash" of block 314 may depend on user data 324 of block 314, but also the user data of the preceding block (if there is one). In some embodiments, the user and/or database may use the "blockHash" of block 314 to uniquely identify the block. In some embodiments, user data 326 may also include data representing the date (e.g., Jul. 16, 2012) when the transaction is committed. As described above, various hash algorithms may be used to determine these hash values, e.g., SHA algorithms, RIPEMD algorithms, MD algorithms, BLAKE algorithms, Whirlpool algorithm, etc. Note that FIG. 3A is only provided as an example for purposes of illustration. In some embodiments, one or more other user data and/or metadata may be included in block 314 as well. For example, in some embodiments, the "revisions" field of user data 324 may also include system-generated metadata, such as hash value(s) generated based on the version of item(s) in the "revisions" field. These hash value(s) may be used as an ID for the particular version of item(s) in block 314 and may be further used to generated the above-described "entriesHash" and "BlockHash." In addition, in some embodiments, the metadata in the "revisions" field of user data 324 may include other metadata, e.g., a "version number" for the version of item(s) in the "revisions" field of block 314.

Referring back to the example, when the user performs the transaction in block 242 to change the vehicle's owner from "John Doe" to "Jane Doe," similarly, the database may generate another block 316 (e.g., similar to block 116), as shown in FIG. 3B, to capture the transaction and updated records. As indicated in FIG. 3B, block 316 may include user data 328 (e.g., similar to user data 128) and metadata 330 (e.g., similar to metadata 130). Also, user data 328 may include data, e.g., in the "transactionInfo" and "revisions" fields, representing the corresponding transaction in block 242 and the "latest" non-deleted version of records in the table after the transaction is committed. In this example, the "latest" non-deleted version of the records is version 2 of the vehicle's registration records in table 206 of FIG. 2B.

For purposes of illustration, each row of the records in a table may be considered a data structure or a "document." In this example, the transaction in block 242 changes only partial data of the data structure or document, e.g., only the name of the owner is changed, but the rest of the registration information stays the same. In some embodiments, user data 328 may include data representing the entire data structure or document, e.g., the entire version of the records, within which data is changed in the transaction, as shown in FIG. 3B. Alternatively, in some embodiments, user data 328 may not necessarily include data representing the entire data structure or document. Instead, user data 328 may include only data representing the changed or updated data or records, e.g., only a partial version of the records. For example, user data 328 may only include data representing that the owner of the vehicle, after the transaction in block 242 committed, is "Jane Doe." In addition, as indicated in FIG. 3A, in some embodiments, data in the "revisions" field of user data 324 may not necessarily be organized as structured data, e.g., according to predetermined columns and/or rows in a table. Instead, the data may be in a semi-structured or non-structured form, e.g., in a JSON or superset JSON type. Therefore, in the disclosure, the data in the "revisions" field of a block may also be referred to as an "item."

Referring back to the example, when the user performs the transaction in block 244 to delete the vehicle's registration from the table, similarly, the database may generate yet another block 312 (e.g., similar to block 112), as shown in FIG. 3C, to capture the transaction and updated records. As indicated in FIG. 3C, block 312 may include user data 320 (e.g., similar to user data 120) and metadata 322 (e.g., similar to metadata 122). Also, user data 320 may include data, e.g., in the "transactionInfo" and "revisions" fields, representing the corresponding transaction in block 244 and the "latest" non-deleted version of records in the table after the transaction is committed. In this example, the "latest" non-deleted version of the records is the current version of the vehicle's registration records in table 202 of FIG. 2C. Since in vehicle's registration is deleted from the table by the transaction in block 244, the "revisions" fields of metadata 320 may thus be empty, as indicated in FIG. 3C.

Note that FIGS. 3A-3C, as well as the blocks described in following sections, are provided only as an example for purposes of illustration. In some embodiments, the content of a block in the journal-based database may not necessarily include exactly the same information as illustrated. Instead, a block may include less or more information. For example, in some embodiments, a block may also include, in the metadata, data representing the position of the block in the chain of the journal, data representing an ID number (different from the blockHash) that is automatically assigned by the database, data representing an ID number assigned to the table, data representing an ID number assigned to the data structure of document within which records are updated, etc.

In some embodiments, the user may need to redact data. For example, the user may request to redact personal information like the name of the owner "John Doe," or to redact a version of an item that includes the personal information such as the name "John Doe," from the database. In other words, the data requested by the user to be redacted may correspond to a specific version of item(s) (that further includes a specific data), or a specific data which is only a partial portion of a version of item(s). According to the foregoing description, the name "John Doe" is part of previous versions of records, and does not exist in the current version of records of table 202, as illustrated in FIG. 2C. However, the name "John Doe" may be part of the data in one or more blocks of the journal, e.g., existing in (e.g., in the "revisions" field of) user data 324 of block 314 that represents at least a partial version (e.g., version 1) of records of the table. Therefore, in some embodiments, the database may search the records of tables 202-206 (if the database stores tables 204-206 with the previous versions of records) and blocks 312, 314, and 316 of the journal to determine where the data exists. For example, the database may determine that the data exists in block 314, e.g., in user data 324 of block 314. Accordingly, the database may redact the data in user data 324. For purposes of illustration, FIG. 3D is provided as an example to illustrate the update of the user data of the block after the data redaction. As shown in FIGS. 3A and 3D, after the redaction, the version of the item in the "revisions" field of user data 324, which represents at least a partial version of version 1 of records in table 204 including the name "John Doe," may be replaced with a hash value "xxxxxx." As described above, in some embodiment, the redaction may not necessarily replace the data with a hash value, but instead delete the data (e.g., version 1 that includes the name "John Doe") from the block. In addition, the "revisions" field of user data 332 may include data representing the date (e.g., "Oct. 23, 2021") when the redaction is committed. However, as described above, to preserve cryptographic verifiability, metadata 330 of block 316 may be stay the same. For example, as indicted in FIGS. 3A and 3D, the "blockHash," "entriesHash," and "previousHash" in metadata 330 of block 316 may still stay the same. As a result, after the data redaction, block 316 in FIG. 3D may still be cryptographically verifiable together with the other blocks of the hash chain in the journal. In addition, if block 316 includes one or more other metadata, e.g., data representing the position of block 316 in the chain, data representing an ID number of block 316, data representing an ID of the table, data representing an ID of the data structure of document within which records are updated, etc., the additional metadata may also be retained during the data redaction. Moreover, in some embodiments, data in the "transactionInfo" field of block 316 may also be preserved. For example, the "transactionInfo" field of user data 332 may still include the same data, as metadata 324, representing the transaction committed in block 240 (e.g., the creation of the table, and the insertion of the records).

Note that FIG. 3D is provided only as an example for purposes of illustration. In this example, the redaction of the data may replace data representing the entire data structure or document (or the entire version of an item) in the "revisions" field with a hash value. In some embodiments, the data redaction may not necessarily redact the entire data structure or document or entire version of item. Instead, it may redact only the data representing the name "John Doe" (e.g., replace only the name "John Doe" with a hash value, or delete only the name), but leave the rest of the data structure or document (or the rest of the version of the item) of the "revisions" field unchanged. In that case, when the user accesses block 316, the user may still be able to obtain other information of the vehicle's registration, such as the "ID," "Manufacturer," "Model," "Year," and/or "VIN" that are not requested to be redacted, but the name "John Doe" may not be accessible anymore.

In addition, as described above, in some embodiments, the database may keep tables 204-206 with the previous versions of records. In that case, when the database searches for existence of the data to be redacted, the database may determine that the data also exists in table 204. Accordingly, the database may redact the data in table 204, e.g., to replacing the data with a hash value or remove the data from table 204.

In some embodiments, the database may further generate block 318 (e.g., similar to block 118), as shown in FIG. 3E, to track the transaction that requests the data redaction. In some embodiments, block 318 may include user data 334 (e.g., similar to user data 134) and metadata 336 (e.g., similar to metadata 136). In some embodiments, user data 334 may include a "transactionInfo" field that may include data recording the transaction that requests the redaction, and a "redactionInfo" field that may include data associated with the redaction request. However, user data 334 may not necessarily include data representing the data requested to be redacted. For example, as indicated in FIG. 3E, the "transactionInfo" field may include data representing the pseudo-statements committed to perform the data redaction, which may specify the block, item ID, and/or version number of item corresponding to the data is to be redacted. In addition, metadata 336 of block 318 may include an "entriesHash" that is calculated based on user data 334, a "previousBlockHash" that is the hash value of the last block of the chain, e.g., hash value of block 316, and a "blockHash" that is the hash value calculated based on the "entiresHash" and "previousBlockHash" of block 318. Therefore, block 318 may refer back to and be appended to block 316 in the journal of the database.

Figure 4:
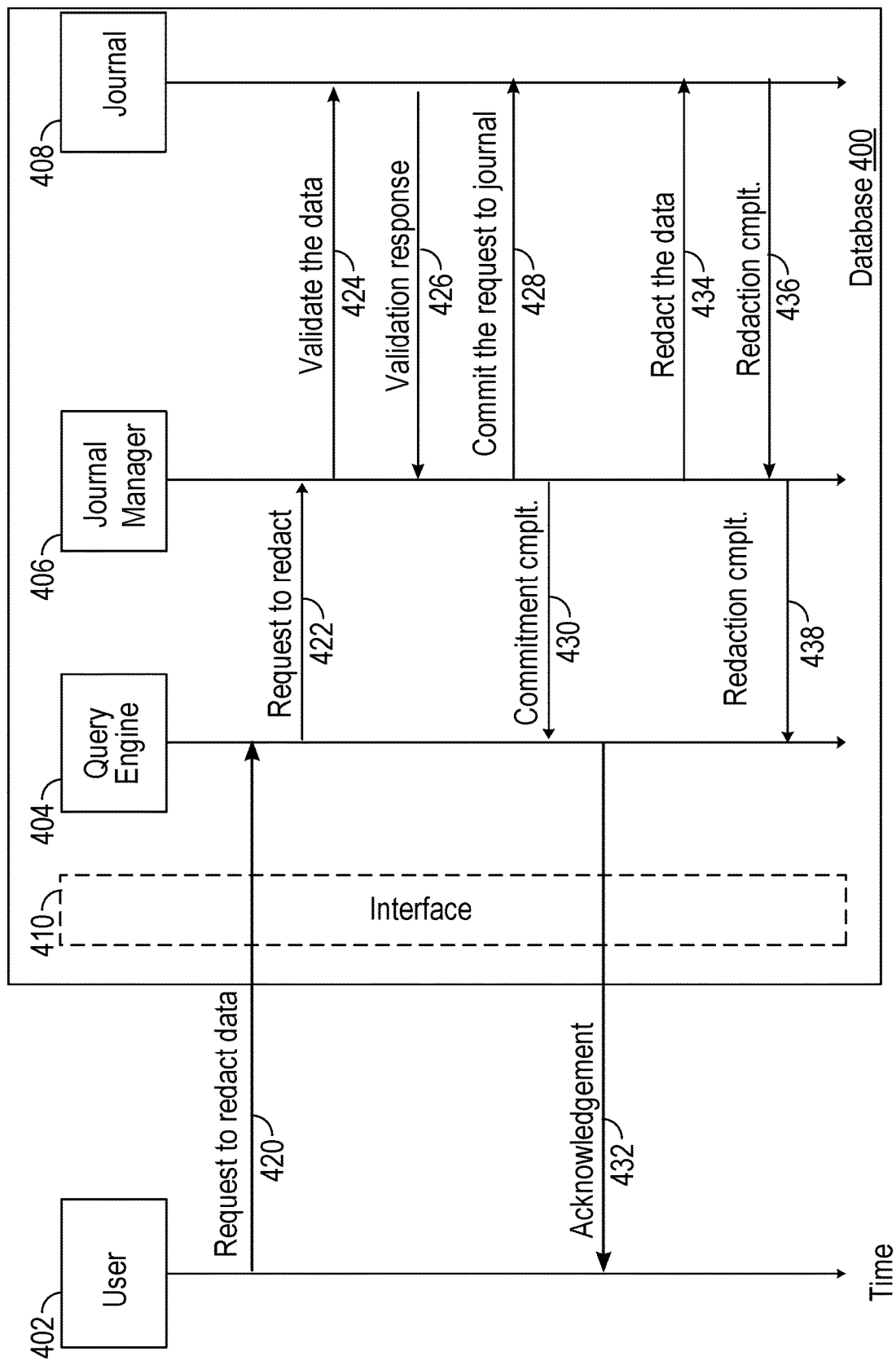
FIG. 4 is a block diagram showing example interactions between a user and a database to perform data redaction, according to some embodiments.

FIG. 4 is a block diagram showing example interactions between a user and a database to perform data redaction, according to some embodiments. In this example, database 400 (e.g., similar to the databases described above) may include query engine 404, journal manager 406, and journal 408. As described above, in some embodiments, journal 408 may include a hash-chained set of blocks that are generated to track the change history to items in database 400. Also, in some embodiments, a current version of the items may be stored in a table (not shown in FIG. 4) in database 400. In some embodiments, database 400 may be accessible via interface 410, through which user 402 may access database 400 via network connections to request performance of various database-related functions. In some embodiments, interface 410 may include various appropriate types of interfaces, e.g., an application programming interface (API), command line interface (CLI), a website-based interface, etc. In addition, in some embodiments, user 402 may use various computing devices, e.g., a laptop, desktop, smartphone, tablet, etc., to interact with database 400.

As indicated in FIG. 4, the vertical lines represent time, and the horizontal lines represent individual interactions between user 402 and database 400. In this example, to perform data redaction, user 402 may provide request 420 to database 400, e.g., via interface 410, to request database 400 to redact specific data. In addition, in some embodiments, request 420 may specify a version of item and/or a block that includes the version of item, in which the specific data resides and is requested to be redacted. In some embodiments, the item and/or block may be specified by the user using the above-described metadata in the blocks of journal 408, e.g., data representing the position of a block, data representing the IDs of the item or block, etc.

In some embodiments, in response to receiving request 420, query engine 404 of database 400 may send request 422 to journal manager 406 to perform the redaction. Accordingly, journal manager 406 may validate 424 whether the specific data exists in the blocks of journal 408. As described above, in some embodiments, request 420 from the user may specify the item and/or block, in which the specific data resides and is requested to be redacted. In that case, journal manager 406 may identify the item and/or block in journal 408 to verify that the specific data exists. In some embodiments, journal manager 406 may further verify that the data has not been redacted yet. In addition, in some embodiments, request 420 from the user may not necessarily specify the location of the specific data in the database. Therefore, as part of validation 424, journal manager 406 may search the individual blocks of journal 408 to determine whether the specific data exists in any of the blocks. Similarly, in some embodiments, if the specific data is identified in a block of journal 408, journal manger 406 may further validate if the specific data in the block has not been redacted before.

In some embodiments, the data redaction may be performed in an asynchronous mode. The asynchronous mode may perform the redaction in multiple steps. For example, in a first step, the request to redact the specific data may be committed to journal 406. In some embodiments, the first step may be finished in a relatively short period of time, e.g., in a few seconds or minutes. For example, upon obtaining completion 426 of the validation, journal manager 406 may command 428 the redaction request to be committed to journal 406. In some embodiment, the commitment of the request to journal 406 may include generating and appending a new block to the hash-chained blocks of journal 406. In some embodiment, the new block may include data, e.g., data similar to user data 334 in FIG. 3E, to record the transaction that requests the redaction of the specific data. In some embodiments, the commitment may also include blocking future accesses to the specific data in the identified block. For example, if database 400 receives a request to read the specific data, an error message may be returned to indicate that the specific data is not accessible or does not exist anymore.

In some embodiments, when the redaction transaction is recorded in journal 408, journal manager 406 may send indication 430 of completion of the commitment to query engine 404. In response, query engine 404 may send acknowledgement 432 to user 402, e.g., to notify user 402 that the redaction request is committed.

Referring back to the above-described asynchronous mode, in a second step of the asynchronous mode, after acknowledgement 432 is provided, the redaction may be materialized. The materialization may include actually redacting 434 the specific data from the identified block of journal 408. In some embodiments, the second step may be finished in a relatively long period of time, e.g., in a few days or months. Therefore, one purpose of the asynchronous mode is to provide user 402 acknowledgement 432 in a relatively short period of time (e.g., seconds or minutes as described above) after receiving request 420, without requiring user 402 to actually wait until the specific data is redacted in journal 408. This is especially beneficially when the specific data requested to be redacted includes a large amount of data.

In some embodiments, once the redaction of the actual data is completed in journal 408, journal manager 406 may obtain indication 436 from journal 408. In some embodiments, journal manager 406 may further send optional indication 438 to inform query engine 404 of completion of the redaction materialization.

As described above, in some embodiments, the specific data to be redacted may exist not only in the block(s) of journal 408, but also in other locations of database 400, e.g., in a previous and/or current version(s) of the item stored in database 400. In that case, in some of the above interactions, database 400 may also identify the other storage locations for the specific data, e.g., in a version of the item in a table stored in database 400, and accordingly redact the data from the identified storage locations. Similar to what is described above, the redaction of the data from the other storage locations may also be performed in an asynchronous mode. For example, query engine 404 and/or journal manager 406 may first identify and validate existence of the specific data in the other storage locations, and redact the actual data afterwards.

Note that the above-described asynchronous mode is only provided as an example for purposes of illustration. In some embodiments, the data redaction may be performed in a different, synchronous mode. For example, in the synchronous mode, database 400 may not necessarily divide the data redaction into multiple steps and provide acknowledgement 432 in the middle of the redaction. Instead, database 400 may combine the operations indicated by 422-430 and 434-438, and provide acknowledgement 432 until after the specific data is in journal 408 redacted (e.g., as indicated by 436-438).

Figure 5:
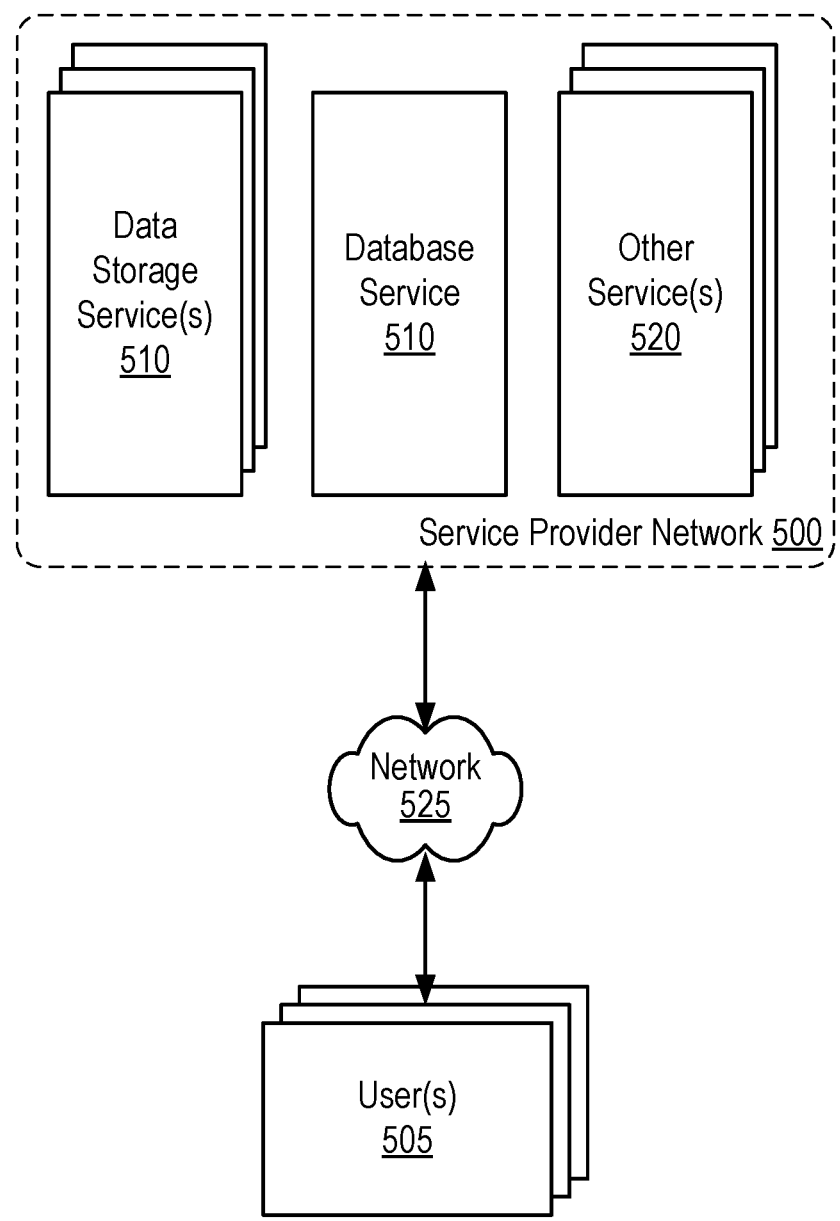
FIG. 5 is a block diagram showing an example provider network that provides a data storage service including journal-based databases with data redaction abilities, according to some embodiments.

FIG. 5 is a block diagram showing an example provider network that provides a data storage service including journal-based databases with data redaction abilities, according to some embodiments. In FIG. 5, provider network 500 may be a private or closed system or may be set up by an entity such as a company or a public sector organization to provide one or more services (such as various types of cloud-based storage) accessible via the Internet and/or other networks to one or more user(s) 505. Provider network 500 may be implemented in a single location or may include numerous data centers hosting various resource pools, such as collections of physical and/or virtualized computer servers, storage devices, networking equipment and the like (e.g., computing system 910 described below with regard to FIG. 9), needed to implement and distribute the infrastructure and storage services offered by provider network 500. In some embodiments, provider network 500 may implement various computing resources or services, such as data storage service(s) 510 (e.g., object storage services, block-based storage services, or data warehouse storage services), database service 520, and other service(s) 520, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 510 may implement different types of data stores for storing, accessing, and managing data on behalf of client(s) 505 as a network-based service that enables one or more user(s) 505 to operate a data storage system in a cloud or network computing environment. For example, data storage service(s) 510 may include various types of database storage services (both relational and non-relational) or data warehouses for storing, querying, and updating data. Such services may be enterprise-class database systems that are scalable and extensible. Queries may be directed to a database or data warehouse in data storage service(s) 510 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 510 may also include various kinds of object or file data stores for putting, updating, and getting data objects or files, which may include data files of unknown file type. Such data storage service(s) 510 may be accessed via programmatic interfaces (e.g., APIs) or graphical user interfaces. Data storage service(s) 510 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, database service 520 may allow user(s) 505 to create journal-based databases (e.g., similar to the databases described above). The journal-based databases may include tables individually associated with respective journals. Each journal may include a hash-chained set of blocks with cryptographic verifiability. Database service 520 may allow users to redact data thoroughly from the journal-based databases, e.g., from tables and/or blocks of the journals, as described above.

Other service(s) 520 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 510. Various other distributed processing architectures and techniques may be implemented by data processing services (e.g., grid computing, sharding, distributed hashing, etc.). Note that in some embodiments, data processing operations may be implemented as part of data storage service(s) 510 (e.g., query engines processing requests for specified data).

Generally speaking, user(s) 505 may use any type of computing devices configurable to submit network-based requests to provider network 500 via network 525, including requests for storage services (e.g., a request to create, read, write, obtain, or modify data in data storage service(s) 510, including requests to redact data in journal-based databases as described above. For example, a given user 505 may use a suitable version of a web browser, or may include a plug-in module or other type of code module configured to execute as an extension to or within an execution environment provided by a web browser. Alternatively, a user 505 may use an application such as a database application (or user interface thereof), a media application, an office application or any other application that may make use of storage resources in data storage service(s) 510 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, user 505 may use an application configured to interact directly with provider network 500. In some embodiments, user(s) 505 may use computing devices configured to generate network-based services requests according to a Representational State Transfer (REST)-style network-based services architecture, a document- or message-based network-based services architecture, or another suitable network-based services architecture.

In various embodiments, network 525 may encompass any suitable combination of networking hardware and protocols necessary to establish network-based-based communications between user(s) 505 and provider network 500. For example, network 525 may generally encompass the various telecommunications networks and service providers that collectively implement the Internet. Network 525 may also include private networks such as local area networks (LANs) or wide area networks (WANs) as well as public or private wireless networks. For example, both a given user 505 and provider network 500 may be respectively provisioned within enterprises having their own internal networks. In such an embodiment, network 525 may include the hardware (e.g., modems, routers, switches, load balancers, proxy servers, etc.) and software (e.g., protocol stacks, accounting software, firewall/security software, etc.) necessary to establish a networking link between given user 505 and the Internet as well as between the Internet and provider network 500. It is noted that in some embodiments, user(s) 505 may communicate with provider network 1100 using a private network rather than the public Internet.

Figure 6:
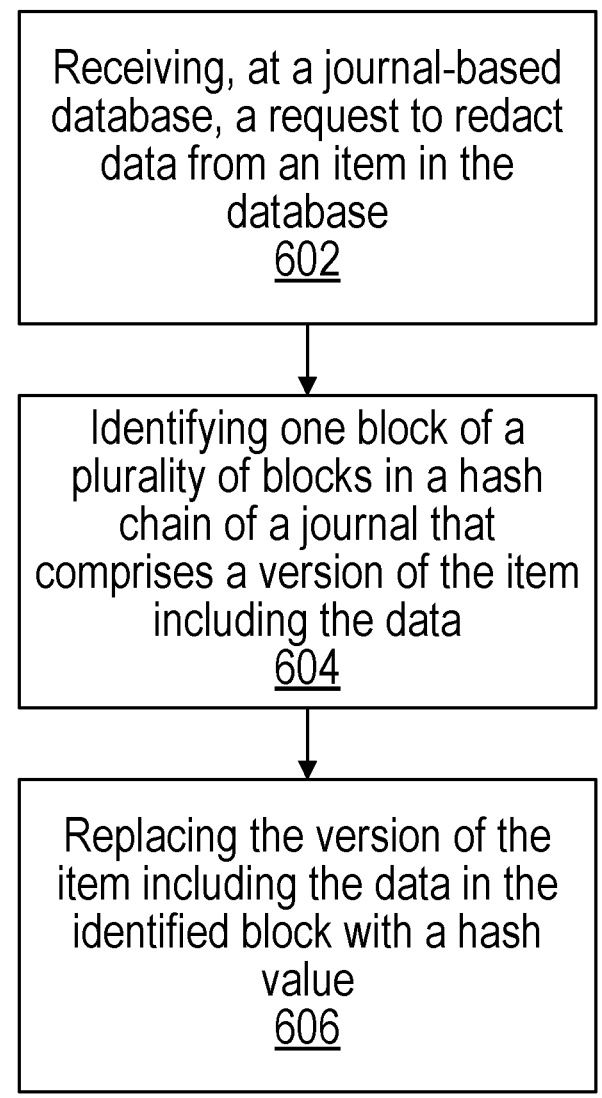
FIG. 6 is a flowchart showing example operations to perform data redaction in a journal-based database, according to some embodiments.

FIG. 6 is a flowchart showing example operations to perform data redaction in a journal-based database, according to some embodiments. In this example, in some embodiments, a request may be received at a journal-based database (e.g., similar to the databases described above) to request redaction of specific data from an item in the database, as indicated in block 602. As described above, in some embodiments, the database may be part of a network-accessible or cloud-based data storage service of a provider network, and the request may be received via an interface of the data storage service and/or the provider network.

In some embodiments, the received request may specify the location of the item. For example, the request may specify one of a hash-chained set of blocks of the journal of the database in which the specific data resides and is requested to be redacted. As described above, in some embodiments, each of the blocks of the journal may individually include a previous or current version of one or more items of the database. For example, each block may include user data that further includes the "transactionInfo" and "revisions" fields. Data in the "transactionsInfo" field may represent one or more transactions committed to the database to update one or more corresponding items, whereas data in the "revisions" fields may represent a version of the corresponding items produced by those transactions. Therefore, when the request includes an indication of the particular block that comprises a version of the item including the specific data, the database may identify the block from the journal, as indicated by block 604.

Alternatively, in some embodiments, the received request may not necessarily specify the location of the specific data requested to be redacted. In that case, the database may automatically search the database, e.g., the individual blocks of the journal to identify the particular block that comprises a version of item including the specific data, as indicated by block 604.

In some embodiments, the database may redact the specific data in the identified block, as indicated in block 606. As described above, in some embodiments, the redaction may replace the version of the item in the identified block that includes the specific data with a hash value. Alternatively, in some embodiments, the redaction may delete version of the item including the specific data from the block. In addition, in some embodiments, if the specific data is only partial of the version of item, but not the entire version of the item, the redaction may redact only the specific data and leave the other data in the version of the item unchanged. Furthermore, as described above, the redaction may not alter existing metadata of the block, or at least the portion of the metadata that is associated with cryptographic verifiability of the block relative to the other blocks in the chain, e.g., the hash value identifying the block, so that the cryptographical verifiability of the hash chain of the journal (including the block after the data is redacted) may be still preserved.

In some embodiments, the specific data may exist in more than one block of the journal. As described above, in some embodiments, the database may only allow data redaction to these blocks one at a time. In that case, the database may redact the specific data from the individual blocks one after another, in a specific or random order. In addition, in some embodiments, the specific data requested to be redacted may exist in a previous version or a current version of records in the database. In that case, the database may also redact the specific data in the previous or current version of records, as described above. In some embodiments, the data redaction may not be allowed on the current version of records. In that case, the database may perform the data redaction in more than one step. For example, as described below in FIG. 8, the database may first redact the specific data in the current version of records, and then redact the specific data in the block corresponding to the (previously) "current" version of records.

Figure 7:
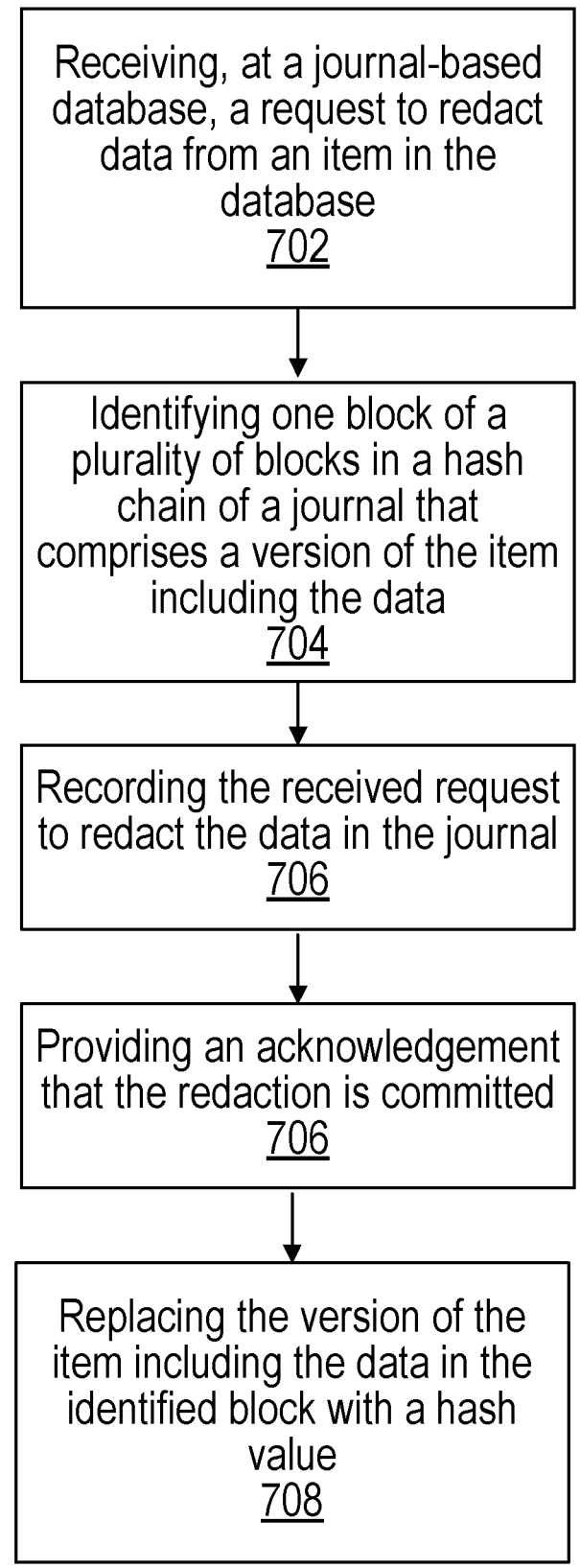
FIG. 7 is a flowchart showing example operations to perform data redaction in a journal-based database, according to some embodiments.

FIG. 7 is a flowchart showing example operations to perform data redaction in a journal-based database, according to some embodiments. In this example, in some embodiments, a request may be received at a journal-based database (e.g., similar to the databases described above) to request redaction of specific data from an item in the database, as indicated in block 702. The database may include one or more items, and a journal associated with the records. The journal may include a hash-chained set of blocks individually including data that represent at least a partial version of the items produced after corresponding transactions to update the items. The partial version of an item may be a partial previous version of the item, or a partial current version of the item. In addition, the blocks may individually include metadata, such as a hash value generated based on and representing the contents of the individual blocks, which may also uniquely identify the individual blocks.

As described above, in some embodiments, the data redaction may be performed in an asynchronous mode. For example, in response to the request, the database may identify one of the blocks comprising a version of the item including the specific data, as indicated in block 704. In some embodiments, the dataset may also validate that the specific data in the identified block has not been previously redacted.

In some embodiments, in response to identifying the block, the database may first record the received transaction that requests the data redaction in the journal, as indicated block 706. As described above, to record the redact transaction, the database may generate and append a new block the hash-chained set of blocks of the journal. The new block may include data, e.g., data similar to user data 334 in FIG. 3E, to record the transaction that requests the redaction of the specific data. In some embodiments, the database may further block future accesses to the specific data, as described above. In some embodiments, after the database records the redaction request, e.g., in the appended block, in the journal, the database may provide an acknowledgement to indicate that the redaction is committed, as indicated by block 706. As described above, the transaction may be recorded and the acknowledgement may be provided in a relatively short period of time after receiving the redaction request.

In some embodiments, after providing the acknowledgement, the database may materialize the redaction, as indicated in block 708. For example, in some embodiments, the database may replace the version of the item including the specific data in the identified block with a hash value. Alternatively, in some embodiments, the database may delete the version of the item including the specific data from the identified block. As described above, the materialization of the redaction may be performed in a relatively longer period of time, e.g., in days or months.

Figure 8:
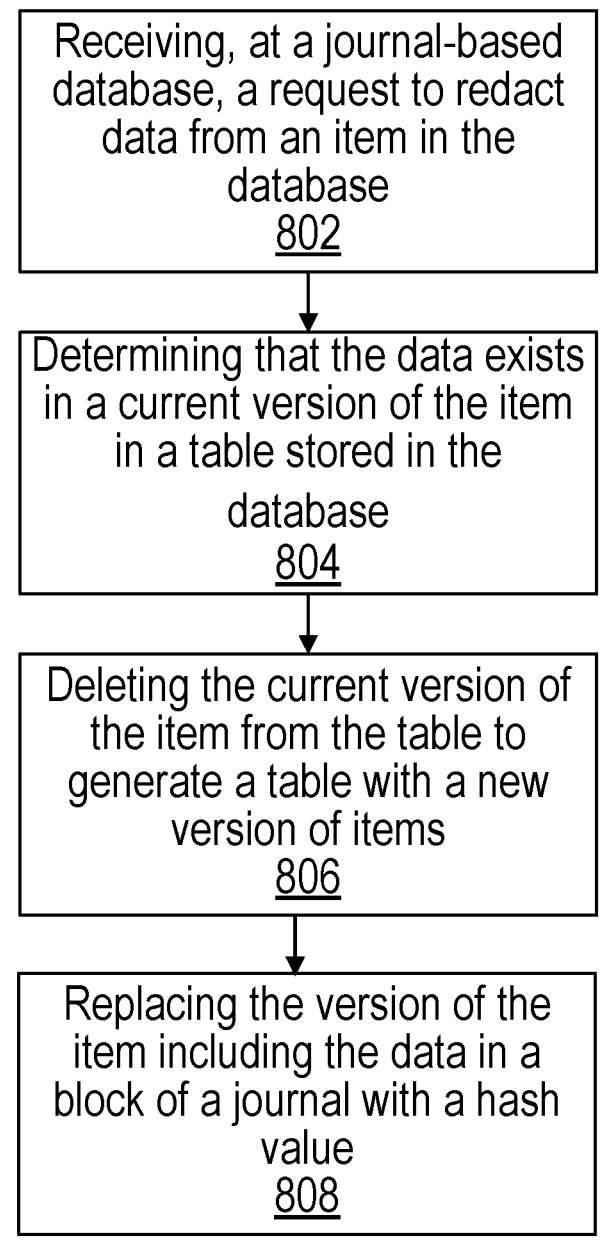
FIG. 8 is a flowchart showing example operations to perform data redaction in a journal-based database, according to some embodiments.

FIG. 8 is a flowchart showing example operations to perform data redaction in a journal-based database, according to some embodiments. In this example, in some embodiments, a request may be received at a journal-based database (e.g., similar to the databases described above) to request redaction of specific data from an item in the database, as indicated in block 802.

As described above, in some embodiments, a current version of the items may be contained in a table, and the specific data requested to be redacted may also exist in the current version of an item in the table, as indicated by block 804. In some embodiments, the data redaction may not necessarily be allowed to apply to the current version of the records directly. Therefore, in that case, the database may first delete the current version of the item including the specific data from the table to generate another table with a newer version of items, where the specific data does not exist anymore in the newer version of the items, as indicated block 806. Further, the database may generate and append a new block to the hash-chained set of blocks of the journal to record the deletion of the specific data and the newer version of the item produced by the deletion. Since the current version of the item including the specific data is deleted, the newer version of the item in the new block may be empty, e.g., as indicated by data in the "revisions" field of user data 320 in FIG. 3C.

Because the newer version is generated, the previously "current" version of the item may now become an old version of the item, and therefore the data redaction may be applied, e.g., in similar ways as described above. For example, in some embodiments, the database may identify a block of the journal that comprises the previously "current" version of the item including the specific data, and replace the previously "current" version of the item in the identified block with a hash value, as indicated by block 808.

Figure 9:
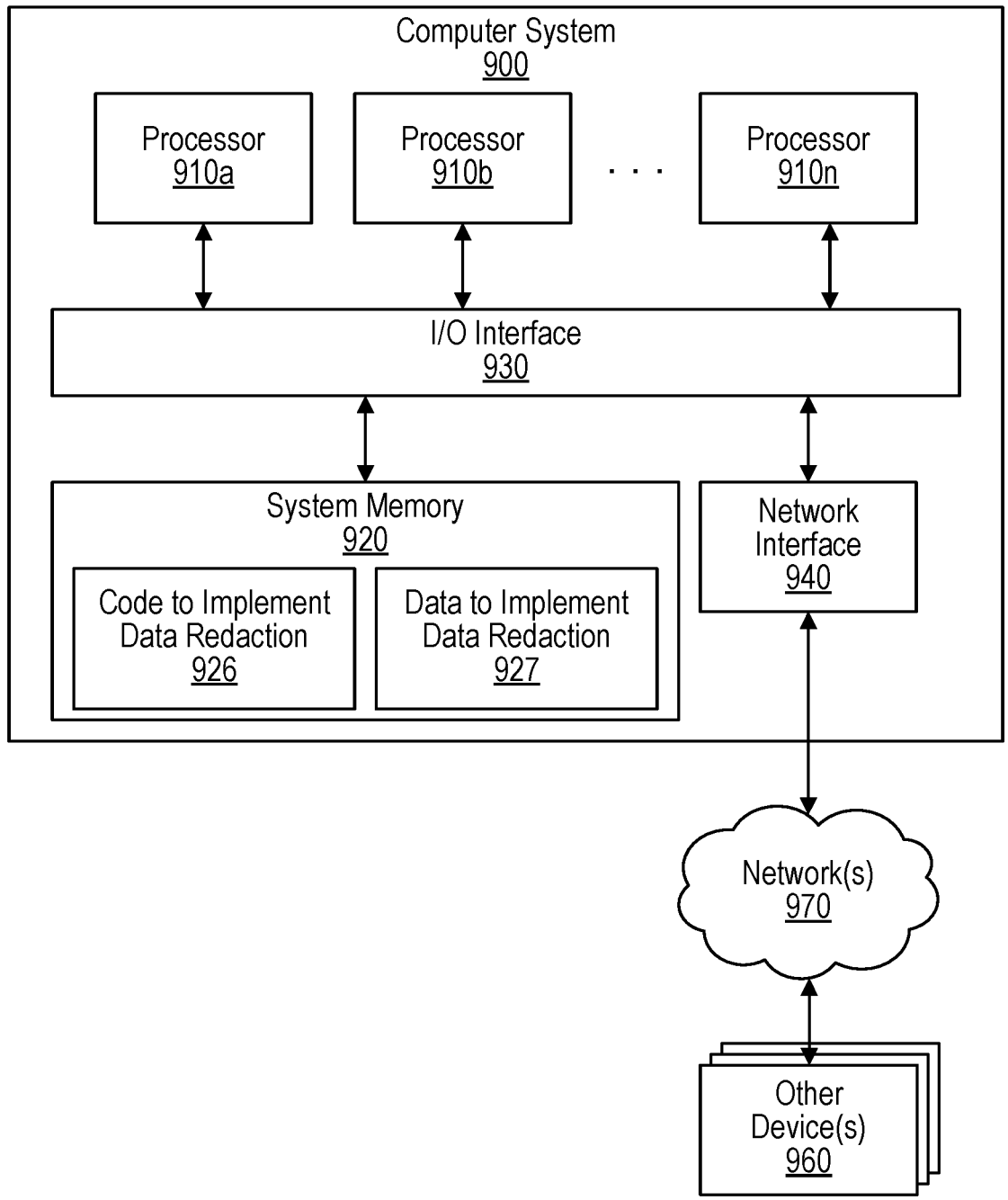
FIG. 9 is a block diagram an example computing system configured to implement the various methods, techniques and systems described herein, according to some embodiments.

The database system described above may in various embodiments be implemented by any combination of hardware and software, for instance, a computer system as in FIG. 9 that includes one or more processors executing program instructions stored on a computer-readable storage medium coupled to the processors. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be one embodiment of a computer-accessible medium configured to store instructions and data accessible by processor(s) 910. In various embodiments, system memory 920 may be implemented using any non-transitory storage media or memory media, such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. In the illustrated embodiment, program instructions (e.g., code) and data implementing one or more desired functions, such as data redaction in a journal-based database described above, are shown stored within system memory 930 as code 926 and data 927.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fiber Channel SANs, or via any other suitable type of network and/or protocol.

In some embodiments, system memory 920 may be one embodiment of a computer-accessible medium configured to store program instructions and data as described above for FIG. 1—xx. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description is to be regarded in an illustrative rather than a restrictive sense.

What is claimed is:

1. A system, comprising:
one or more computing devices configured to implement a database that comprises a table associated with a journal, wherein the table comprises one or more items, wherein the journal comprises a hash-chained set of blocks, wherein individual ones of the hash-chained set of blocks comprise (a) data representing corresponding updates committed to individual ones of the items of the table, (b) data representing previous or current versions of the individual items produced by the committed updates, and (b) metadata that includes corresponding hash values identifying the individual blocks;
wherein the one or more computing devices are configured to:
receive a request to redact first data from a version of an item in the journal of the database;
determine one block of the hash-chained set of blocks of the journal that comprises the data representing the version of the item that includes the first data; and
replace the version of the item in the determined block with a hash value, wherein the replacement of the version of the item in the block comprises retaining the corresponding hash value in the metadata of the block that identifies the block.

2. The system of claim 1, wherein to replace the version of the item with the hash value, the one or more computing devices are configured to:
in response to determining the block,
append a block to the hash-chained set of blocks in the journal, wherein the appended block comprises data representing the received request to redact the first data;
after appending the block, provide an acknowledgement that the redaction is committed; and
after providing the acknowledgement, replace the version of the item in the identified block including the first data with the hash value.

3. The system of claim 1, wherein the individual ones of the hash-chained set of blocks further comprise corresponding hash values identifying respective blocks that precede the individual blocks.

4. The system of claim 1, wherein the one or more computing devices are part of a network-accessible service provider network, and the database is part of a database service offered by the network-accessible service provider network.

5. A method, comprising:
receiving, at one or more computing devices implementing a database, a request to redact first data from an item in the database, wherein the database implements a journal to record transactions committed to the database, wherein the journal records the transactions performed on individual items of the database in corresponding ones of a plurality of blocks in a cryptographically verifiable hash chain along with corresponding versions of the individual items produced by the transactions;
identifying, by the one or more computing devices, one of the plurality of blocks of the journal that comprises a version of the item including the first data; and
replacing, by the one or more computing devices, the version of the item including the first data in the identified block with a hash value, wherein after the version of the item is replaced with the hash value, the block preserves an ability to be cryptographically verifiable with other ones of the plurality of blocks in the hash chain.

6. The method of claim 5, wherein the individual ones of the plurality of blocks comprise corresponding hash values identifying the individual blocks, and wherein replacing the version of the item in the block with the hash value comprises retaining the corresponding hash value of the block such that the cryptographical verifiability of the plurality of blocks in the hash chain is preserved.

7. The method of claim 5, wherein replacing the version of the item including the first data with the hash value comprises:
in response to identifying the block,
recording the request to redact the first data in the journal;
after recording the request, providing an acknowledgement that the redaction is committed; and
after providing the acknowledgement, replacing the version of the item in the identified block including the first data with the hash value.

8. The method of claim 7, wherein recording the request to redact the first data in the journal comprising appending a block to the plurality of blocks in the hash chain, wherein the appended block comprises data representing the request to redact the first data.

9. The method of claim 5, wherein individual ones of the plurality of blocks comprise corresponding hash values identifying respective blocks that precede the individual blocks.

10. The method of claim 5, wherein the request to redact the first data specifies the block that comprises the version of the item including the first data.

11. The method of claim 5, wherein the version of the item including the first data is a previous version of the item, upon which one or more transactions are performed and recorded in corresponding blocks of the journal.

12. The method of claim 5, further comprising:
determining that the version of the item including the first data is a current version of the item; and
in response to determining that the version of the item is a current version,
identifying a table in the database that comprises the current version of the item; and
deleting the current version of the item from the table to generate a table with a new version of the item, wherein replacing the version of item in the block with the hash value is performed after the current version of the item is deleted from the table.

13. The method of claim 5, further comprising:
receiving a request to redact second data from an item in the database;
identify one of the plurality of blocks of the journal that comprises a version of the item including the second data; and
deleting the version of the item in the identified block that includes the second data, wherein after the version of the item including the second data is deleted, the identified block preserves an ability to be cryptographically verifiable with other ones of the plurality of blocks in the hash chain.

14. The method of claim 5, wherein the one or more computing devices are part of a network-accessible service provider network, and wherein the database is part of a database service offered by the network-accessible service provider network.

15. One or more non-transitory computer readable media storing program instructions that when executed on or across one or more processors, cause the processors to:
receive a request to redact first data from an item of a database, wherein the database is associated with a journal that records transactions committed to the database, wherein the journal records the transactions performed on individual items of the database in corresponding ones of a plurality of blocks in a cryptographically verifiable hash chain along with corresponding versions of the individual items produced by the transactions;
identify one of the plurality of blocks of the journal that comprises a version of the item including the first data; and
replace the version of the item in the identified block with a hash value, wherein the replacement of the version of the item in the block comprises retaining a hash value in the block that identifies the block.

16. The one or more non-transitory computer readable media of claim 15, wherein to replace the version of the item with the hash value, the program instructions cause the processors to:
in response to identifying the block,
record the request to redact the first data in the journal;
after recording the request, provide an acknowledgement that the redaction is committed; and
after providing the acknowledgement, replace the version of the item in the identified block including the first data with the hash value.

17. The one or more non-transitory computer readable media of claim 16, wherein to record the request to redact the first data in the journal, the program instructions cause the processors to:
generate a block to include data representing the request to redact the first data; and
append the generated block to the plurality of blocks in the hash chain.

18. The one or more non-transitory computer readable media of claim 15, wherein the request to redact the first data specifies the block that comprises the version of the item including the first data.

19. The one or more non-transitory computer readable media of claim 15, wherein the program instructions cause the processors to search the plurality of the blocks in the hash chain to identify the block that comprises the version of the item including the first data.

20. The one or more non-transitory computer readable media of claim 15, wherein the version of the item including the first data is a previous version of the item, upon which one or more transactions are performed and recorded in corresponding blocks of the journal.

* * * * *